No. 765,354. PATENTED JULY 19, 1904.
J. L. BOONE.
HOPPLE.
APPLICATION FILED NOV. 26, 1901. RENEWED JUNE 20, 1904.
NO MODEL.
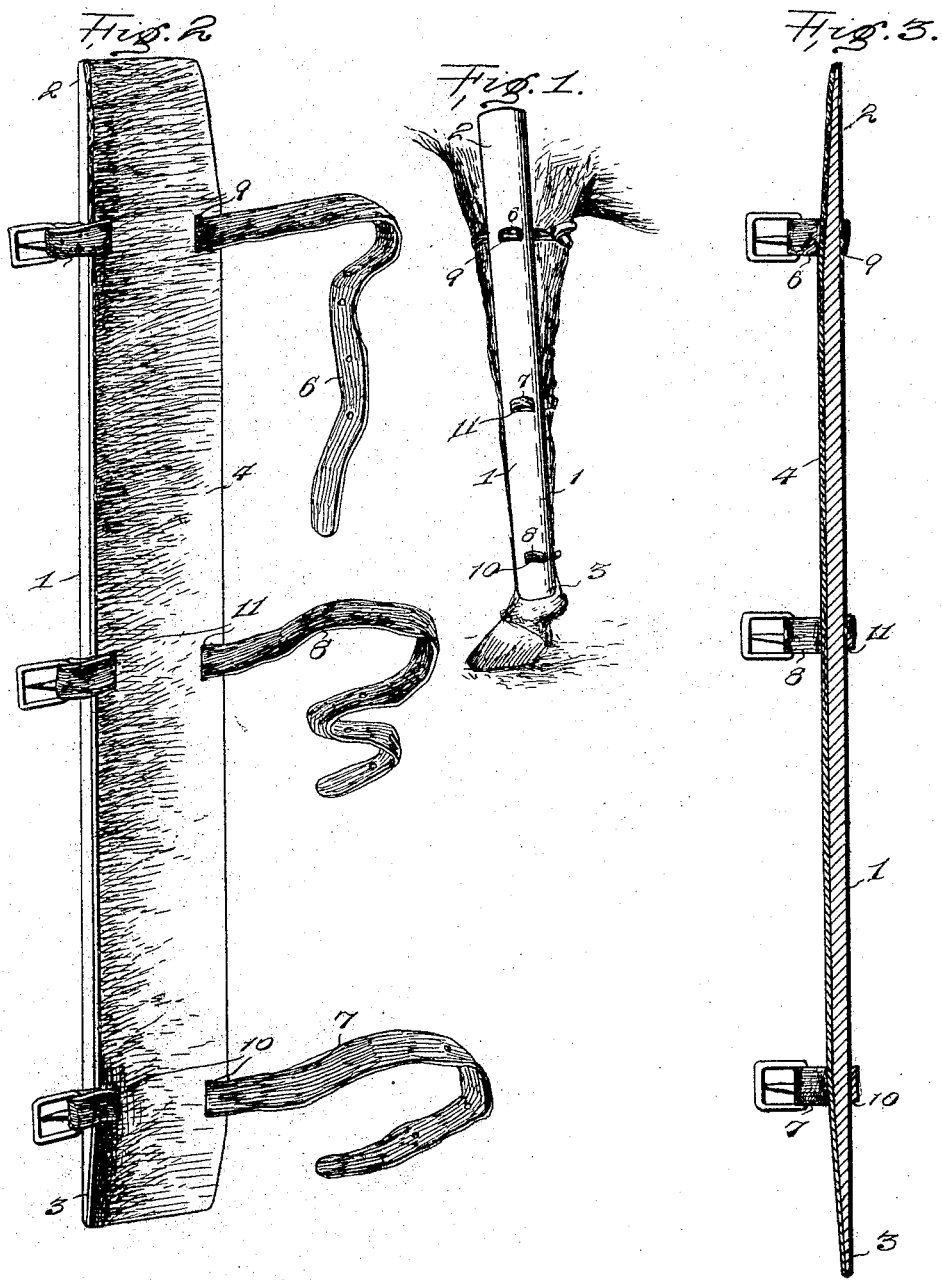
Witnesses
J. L. Boone Inventor
by
Attorneys No. 765,354.

Patented July 19, 1904.

UNITED STATES PATENT OFFICE.

JOSEPH LAINE BOONE, OF HICKORY PLAINS, MISSISSIPPI.

HOPPLE.

SPECIFICATION forming part of Letters Patent No. 765,354, dated July 19, 1904.

Application filed November 26, 1901. Renewed June 20, 1904. Serial No. 213,356. (No model.)

*To all whom it may concern:*

Be it known that I, JOSEPH LAINE BOONE, a citizen of the United States, residing at Hickory Plains, in the county of Prentiss and State of Mississippi, have invented a new and useful Hopple, of which the following is a specification.

The invention relates to improvements in hopples.

The object of the present invention is to improve the construction of hopples and to provide an exceedingly simple and inexpensive one of great strength and durability adapted to be readily applied to either the front or hind leg of a horse or other animal and capable of effectually preventing the same from running, jumping, kicking, or the like.

A further object of the invention is to provide a hopple of this character which will not chafe the leg of an animal and which will be prevented from working around to the inner side of the leg to a point beneath the body of the animal, whereby injuries from such causes are effectually prevented.

The invention consists in the construction and novel combination and arrangement of parts hereinafter fully described, illustrated in the accompanying drawings, and pointed out in the claim hereto appended.

In the drawings, Figure 1 is a perspective view of a hopple constructed in accordance with this invention and shown applied to the leg of an animal. Fig. 2 is a similar view of the device detached. Fig. 3 is a vertical sectional view of the same.

Like numerals of reference designate corresponding parts in all the figures of the drawings.

1 designates a hopple consisting of a bar of wood or other suitable material extending from a point a short distance above the hoof to a point adjacent to the shoulder of the animal, as illustrated in Fig. 1 of the drawings, and the upper end of the bar is extended a sufficient distance to prevent the bar from working under the belly of the animal, and thereby injuring it. The upper and lower ends 2 and 3 of the bar are beveled to offset them from the adjacent portions of the animal to prevent them from rubbing, chafing, or otherwise injuring it. The bar between the beveled ends fits closely against the leg of the animal and is adapted to be applied to either the front or hind leg, and it is provided at its inner face with a pad or lining 4 of soft material, which is secured to the inner face of the bar by cement or other adhesive material, which obviates the necessity of employing fastening devices, and the bar of the hopple is entirely free from such fastening devices, so that there is no liability of scratching the animal or otherwise injuring or annoying it by the projecting heads of such devices. The pad or lining forms a soft inner face for the hopple, and the latter is adapted to be conveniently worn by a horse or other animal.

The hopple is rigidly secured to the leg of an animal by means of straps 6, 7, and 8, arranged at the top, bottom, and at an intermediate point and forming loops for encircling the leg of the animal. The hopple is provided with slots 9, 10, and 11, arranged in pairs at the top, bottom, and approximately the center of it and receiving the straps, which are provided with buckles. The straps pass through the slots of the hopple, and the ends of the straps extend from the inner face of the same and are adapted to be readily buckled around the leg. They are arranged around the leg at the upper and lower portions thereof and at the knee-joint, and when the hopple is applied to the leg it prevents the animal from bending the same. This will prevent the animal from running, jumping, or kicking, and, if desired, a hoppple may be applied to either the front or hind leg, or to both.

It will be seen that the hopple is exceedingly simple and inexpensive in construction, that it possesses great strength and durability, and that it is adapted to be readily applied to the leg of an animal. It will also be apparent that the ends of the hopple are prevented from chafing the animal and that the upper end of the bar is extended sufficiently to prevent it from working beneath the body of the animal and injuring the same.

What I claim is—

A hopple comprising a thin straight bar designed to be located wholly on the outer side of the leg of an animal and provided with a padded or protected inner face and having the inner faces of its ends beveled to offset the terminals of the bar from the leg to avoid irritating the same, and flexible connections arranged at intervals and forming loops for encircling the leg of an animal, the top flexible connection being located at the top of the leg, and the bar being extended a considerable distance above the belly of the animal to form a guard for engaging the sides of the body, whereby the hopple is effectually prevented from working around the leg and getting beneath the body of the animal, substantially as described.

In testimony that I claim the foregoing as my own I have hereto affixed my signature in the presence of two witnesses.

JOSEPH LAINE BOONE.

Witnesses:
  H. H. YOTES,
  J. L. FRASER